2,945,039

PROCESS FOR TREATING THIAMINE

Abner S. Salant, Plainfield, N.J., assignor to General Foods Corporation, White Plains, N.Y., a corporation of Delaware No Drawing. Filed Aug. 11, 1958, Ser. No. 754,160

4 Claims. (Cl. 260—256.6)

This invention relates to the treatment of thiamine to render it capable of being stored for extended periods of time and the product so prepared.

As is well known to those skilled-in-the-art, thiamine, vitamin $B_1$, is found in various foods, typically milk, egg yolk, and in various animal tissues including the heart, liver and kidneys. Thiamine is essential for the maintenance of a functionally normal nervous system. In cases of thiamine deficiency it is common to observe loss of appetite, unusual susceptibility to fatigue and gastro-intestinal disturbance. Accordingly, in cases where for one reason or another the thiamine intake is below normal or where, because of the peculiar situation which prevails the system is unable to utilize thiamine which may be present, it is necessary to add additional thiamine to the diet.

Although thiamine, when so employed, is generally utilized in the form of its chloride-hydrochloride, other salts including the mono-nitrate have been prepared and may be used. When the term thiamine is used by those skilled-in-the-art and also in this application, it includes the well known salts thereof as well as the base itself.

When a vitamin enriched solid food is prepared by adding to that solid food desired amounts of thiamine to form a dry mixture which is then stored, it is found that after a certain brief period of time, the enriched food becomes undesirable. More specifically, it acquires a certain bran-like or yeast-like flavor, odor and taste which results in a very low consumer preference for the treated product.

When the thiamine is used to enrich a liquid, e.g. milk, or when the dry enriched material, e.g. dried milk is added to water, it is found that the undesirable bran-like or yeast-like flavor and odor develop even more quickly than when in the dry state. The distasteful characteristics of either the wet or the dry enriched materials develops so quickly that the storage life thereof is substantially nil and it is not possible to practically utilize the enriched materials unless they are to be consumed substantially immediately after enrichment. In many cases it is found that the freshly prepared or treated thiamine possesses these undesirable features.

It is well known to those skilled-in-the-art that various attempts have been made to treat thiamine in a manner to permit attainment of a product which does not have the heretofore mentioned undesirable features but rather which has an extended shelf life. Shelf life as used herein means the period of time before the bran-like or yeast-like flavors and odors build up to an undesirable level. A wide variety of materials have been tried in the several attempts to eliminate this undesirable feature of thiamine. Numerous polymeric carbohydrates such as gums, dextrins, and modified starch have been employed. Among the gums which have been tried are gum arabic, gum tragacanth, locust bean gum, pectin, and numerous others. It has been found that in each case the enriched food containing thiamine with the heretofore mentioned materials was found after brief periods of storage to possess the undesirable bran-like or yeast-like character. For example, in one series of tests, a control sample of thiamine (in the form of its mono-nitrate) was added to spring water to obtain a concentration of 0.5 mg. of thiamine mono-nitrate per 250 ml. of water, the water having been previously adjusted to pH 3.5. The sample was permitted to stand at 15° C.–20° C. for 18 hours and tested to determine the presence or absence of a bran-like or yeast-like charatcer.

Various other samples were evaluated by comparison with this control. Specifically sodium alginate, gum arabic, gum tragacanth, locust bean gum, and pectin were each separately dispersed in aqueous dispersion at pH 4.5. Each dispersion was then diluted to a viscosity at which it could be drum dried. Thiamine mono-nitrate was added to the diluted dispersion with stirring at levels amounting to 1.2% by weight of the gum solids and each dispersion was then drum dried. The various specimens of gum fixed thiamine were then added to spring water to form solutions of the same concentration as that of the control, i.e. 0.5 mg. thiamine mono-nitrate per 250 ml. of water, the water having previously been adjusted to pH 3.5.

Each of the solutions so prepared was permitted to stand for 18 hours at a temperature of about 15° C.–20° C. Specimens of each of the several dried, gum fixed samples were also permitted to stand for the same period of time at the same temperature. At the end of this time, each of the samples, both wet and dry, was tested by tasting.

In all cases, it was found that the samples were entirely unsatisfactory in that they possessed an offensive bran-like or yeast-like flavor, odor and taste, which rendered the sample organoleptically unacceptable for use in connection with foods.

As a result of the inability to prepare thiamine enriched foods which are characterized by suitable flavor, odor, and taste characteristics, the use of thiamine in food has been considerably decreased to the point where it is primarily useful in connection with foods wherein the characteristic flavors and odors are so strong that the thiamine produced flavors and odors are overpowered or wherein the food flavor and odor are compatible with the thiamine produced flavor and odor.

It is an object of this invention to provide a technique for treating thiamine to permit its use in wet or dry products under conditions such that the potency of the thiamine is retained and the formation of undesirable flavors and odors is eliminated or minimized. Other objects will be apparent to those skilled-in-the-art on inspection of the following description.

According to certain aspects of this invention thiamine characterized by extended shelf life and freedom from undesirable bran-like or yeast-like flavors and odors may be prepared by the process which comprises adding thiamine to an aqueous acidic dispersion of carragheen.

Carragheen, a mucilaginous material, is a sulfated polysaccharide containing metallic cations recovered from marine plants of the Gigartinacea family, typically Irish moss. The preferred class of carragheen compounds found particularly useful in the present invention includes the alkali carragheenates, formed by removal of calcium from the carragheen and the substitution of alkali cation such as sodium, potassium, ammonium, or the like.

The thiamine may be employed in any of its forms as hereinbefore noted, i.e. as the base or as the salt, e.g. the mono-nitrate, the chloride hydrochloride, etc.

The treating technique of the instant invention is effected by mixing the carragheen and the thiamine in the wet state.

Under preferred conditions the treating may include formation of a solution of thiamine and a substantial excess of carragheen. Typically, the thiamine may be present in amounts of 0.5% to 25% by weight of the carragheen. Preferably, the solution will contain thiamine at a level in the order of 1.2% by weight of the carragheen, will be acidic and will be in the neighborhood of pH 3. The solution may be dried by any common drying means, e.g. spray drying, drum drying, etc., which will not destroy the thiamine or degrade the carragheen. For example, satisfactory preparations were prepared by drum drying a carragheen dispersion containing thiamine at a level of 1.2% by weight of the carragheen. The dispersion had a total solids content of about 3–5% and was atmospherically dried to a moisture content of less than 10% on 12-inch diameter stainless steel drum drying rolls.

It is a particular feature of this invention that the thiamine, which has been treated with the carragheen, possesses the same nutritional properties as the untreated thiamine. The product, treated thiamine, is in all respects the equivalent of the thiamine which was to be treated except, of course, that the treated material is improved with respect to its flavor and odor characteristics as hereinbefore noted. Otherwise, the product has the same biological and chemical properties; it can be used for the same purposes as the untreated thiamine with the same results. It has the same biological activity as does the untreated thiamine. It can be used in the same amount (on an equivalent thiamine basis) as the raw material for correcting thiamine deficiencies as well as for any other use.

It is a particular feature of the invention, however, that the product of this invention, whether in the dry state or in the wet state, retains its vitamin potency under normal conditions, even in the presence of various mineral salts such as copper sulfate, ferrous sulfate, etc. Although the treated thiamine is eminently superior with respect to its flavor and odor, shelf life and stability, it has been found that, when fed, it is readily assimilated in the body in the same manner and at the same rate as is thiamine which has not been treated in accordance with this invention.

To illustrate the superior storage properties of the thiamine product of this invention, a series of tests were made. The tests included the production of a control and the production of various thiamine preparations containing gums.

The control sample was prepared by adding 0.5 mg. of thiamine mono-nitrate to 250 ml. of spring water which had been previously adjusted to pH 3.5. Each of the samples containing the various gums was produced by preparing an aqueous dispersion of the gum and adjusting to pH 4.5. The dispersions were then diluted to a viscosity at which they could be drum dried. Thiamine mono-nitrate was added to the diluted dispersions with stirring at levels amounting to 1.2% by weight of the gum solids and the dispersion was then drum dried. The wet specimens were prepared by adding the dry specimen to spring water in concentration of 0.5 mg. thiamine mono-nitrate per 250 ml. of water, the water having previously been adjusted to pH 3.5.

A carragheen-thiamine preparation was also prepared under identical conditions and in each case the wet samples and the dry samples were allowed to stand at a room temperature of 15° C.–20° C. for 18 hours. The evaluation was by taste and aroma. A sample was rated as unsatisfactory if it had the bran-like or yeast-like character, so well known to those skilled-in-the-art. Any samples, which after standing at 15° C.–20° C. for 18 hours did not possess this undesirable bran-like or yeast-like character, were rated satisfactory. It was found that for a given gum both the wet and the dry samples received the same evaluation.

| Sample No. | Gum | Evaluation |
| --- | --- | --- |
| A | Sodium alginate | Unsat. |
| B | Gum arabic | Unsat. |
| C | Gum tragacanth | Unsat. |
| D | Locust bean gum | Unsat. |
| E | Pectin | Unsat. |
| F | Carragheen | Satisfactory. |
| G | Control | Unsat. |

From the above tabulation, it will be observed that only the thiamine sample containing carragheen is satisfactory, in that no bran-like or yeast-like characteristic was detected. All the other samples of thiamine containing various other gums were found to be unsatisfactory. When tested in the mouth, all of the specimens except the carragheen containing specimen were found to be peculiarly objectionable. Thus, it was found that carragheen, both in wet and dry state, produced results which were eminently superior to those obtained by use of other gums under comparable conditions.

In order to ascertain the biological potency of the product of this invention, specimens of the thiamine-carragheen product were subjected to a bioassay in accordance with the method described on page 771 of the VII edition of Official Methods of Analysis of the Association of Official Agricultural Chemists published by the Association of Official Agricultural Chemists, 1950. These experiments indicated that the vitamin potency of thiamine containing carragheen prepared in accordance with this invention is the same as pure thiamine; the product of this invention is identical to the thiamine starting material with respect to its nutritional properties. A chemical assay for thiamine per se (as described on page 822 under section 38.29 of the VIII edition (1955) of the Official Methods of Analysis of the Association of Official Agricultural Chemists) indicated that thiamine is present in the product in the same form in which it is present in the thiamine starting material to be treated in accordance with the instant invention.

The following are examples of the present invention and indicate, by way of example, a typical technique for preparing the product of this invention and also a typical technique for preparing a dry beverage mix containing the product of this invention.

EXAMPLE 1

Dry blend 5 grams of Kraystay–S (a carragheen product of the Phenix Foods Company) and 4.75 mg. of thiamine mono-nitrate. Kraystay–S is a carragheen or Irish moss extract which has been subjected to ion exchange washings and hydrolysis, whereby substantially all of the calcium has been replaced with sodium. With a mechanical stirrer disperse this blend in 150 ml. of water adjusted to pH 3.5 by dilute hydrochloric acid. Spread the dispersion into a thin layer about 1/16″ thick and dry in a cool air tunnel for 48 hours. The resulting product dries in a papery flexible sheet about 1/32″ thick which can be ground and is dispersible in water.

EXAMPLE 2

*Nutritive dry beverage mix—ingredients*

|  | G. |
| --- | --- |
| Dextrose | 63.99 |
| Sucrose | 20.36 |
| Citric acid | 3.30 |
| Mineral mix containing: 0.83 g. trisodiumphosphate decahydrate; 0.658 g. calcium lactate; 0.0056 g. iron sulfate septahydrate; 0.0041 g. copper sulfate pentahydrate | 1.50 |
| The product of Example 1 | 0.50 |

To this mix may be added suitable flavors and colors.

Add the mix to one pint of cold water and stir. The beverage does not develop any bran-like or yeast-like flavor or odor even after standing for 18 hours in the hereinbefore described standard test. The potency of the thiamine is retained even after standing overnight.

The thiamine-carragheen product of the present invention can be employed to advantage in liquid or in dry reconstitutable beverage mixes, as above, and generally in food and pharmaceutical products such as rice, cereals, and the like, which are to be enriched by thiamine. It will be apparent to those skilled-in-the-art that the treated thiamine containing carragheen prepared in accordance with this invention may be used wherever untreated thiamine may be used and that it possesses the same nutritional features possessed by thiamine which has not been treated according to this invention.

It will be understood that while the invention has been described in part by means of specific examples, reference should be had to the appended claims for a definition of the scope of the invention. This application is a continuation in part of application Serial Number 544,005, filed October 31, 1955, and now abandoned.

What is claimed is:

1. The process which comprises adding thiamine to an aqueous acidic dispersion of carragheen at a pH of about 3.5, said thiamine being added in amounts of 0.5–25% by weight of the carragheen.

2. The process which comprises adding thiamine to an aqueous acidic dispersion of carragheen at a pH of about 3.5, said thiamine being added in amounts of 0.5–25% by weight of the carragheen and drying said dispersion containing thiamine.

3. The process which comprises adding thiamine to an aqueous acidic dispersion of carragheen at a pH of about 3.5, said thiamine being present in an amount of 1.2% by weight of the carragheen, and drying said dispersion containing thiamine.

4. The process which comprises dry blending 4.75 mg. of thiamine mono-nitrate and 5 g. of carragheen, dispersing said dry blend in 150 ml. of water adjusted to pH 3.5 and then drying said dispersion.

References Cited in the file of this patent

UNITED STATES PATENTS 2,322,270     Atkin et al.             June 22, 1943

OTHER REFERENCES

Mantell: Water Soluble Gums, pp. 97–98 (1947).